3,687,807
Patented Aug. 29, 1972

3,687,807
METHOD FOR EXTRACTING D-XYLOSE FROM XYLAN CONTAINING MATERIAL
Per Stranger-Johannessen, Oslo, Norway, assignor to A/S Norcem
Filed June 10, 1969, Ser. No. 831,849
Claims priority, application Norway, June 11, 1968, 2,276/68
Int. Cl. C07c 47/18
U.S. Cl. 195—11      9 Claims

ABSTRACT OF THE DISCLOSURE

Xylose is extracted from xylan-containing plant material such as birch wood. The plant material is partially hydrolyzed in a weak acid, for example bisulphite, such that the cellulose content remains substantially unaffected whereas the xylan and at least part of the lignin is dissolved. After neutralizing, the hydrolysate is concentrated and extracted by liquid-liquid-extraction with a polar organic solvent having a dielectric constant of less than 27 at 20° C. The temperature of the extraction step is from 30 to 110° C. and the water content of the extraction system is from 4 to 28% by weight. D-xylose of high purity is obtained by simple crystallization after removal of the extraction solvent.

---

Figure 1:
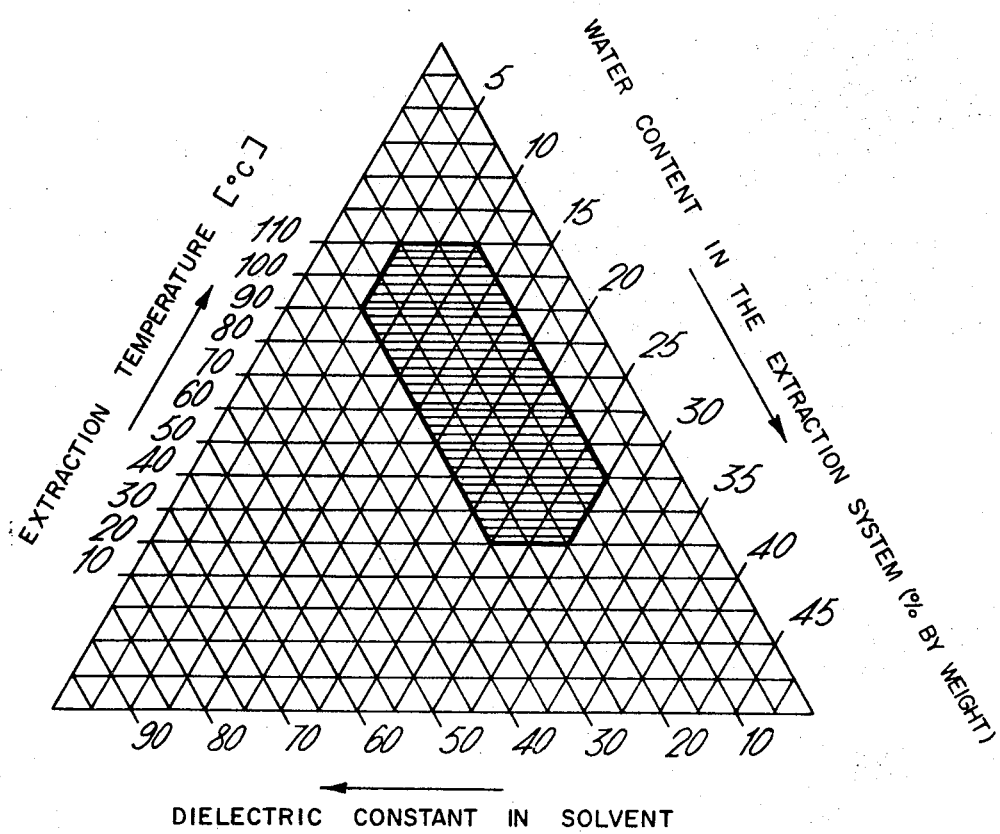

D-xylose is widely distributed in the vegetable kingdom in the form of complex poly saccharides, xylan, which is mainly composed of xylose-units combined with a small component of arabinose and uronic acids.

The largest occurrences of xylan are found in leaf wood and straw plants where the xylan content, defined as xylose, usually lies within the range of 10–25%. For example white birch and yellow birch having a xylan content of 24 and 20% respectively may be mentioned and the European birch has a xylan content of 17%.

Straw plants, like wheat, oat, esparto etc. contain approximately 17% xylan, while the xylan content in bagasse, after removal of sucrose, is increased to 30%. This is an example of how the relative content of xylan is increased when one of the main components not containing xylan has been removed.

From the xylan containing materials, which all have a relatively large content of cellulose and lignin, it is possible by suitable methods of hydrolysis to produce xylose solutions containing comparably small amounts of hydrolysis products of cellulose and lignin and thus obtain a xylose content in the hydrolysate amounting to twice or more than twice as much as the original content in the plant material, and the hydrolysis can be carried out so as to yield a hydrolysate which besides containing much D-xylose also permits a simple manufacture of pure D-xylose with a good yield.

The present invention thus relates to a method for extracting D-xylose from xylan containing plant material, as leaf wood, bagasse, corn, straw, alfa-alfa etc., wherein the starting material is first submitted to an acidic partial hydrolysis, e.g. with a bisulphite-solution, so as not to decompose the present cellulose, whereupon the hydrolysate after removal of the cellulose material is at first deadened (neutralized) by the aid of basic or deadening salts, then concentrated, preferably in vacuum to a dry or partly dry state, and the method is characterized in that the hydrolysate is then submitted to a liquid-liquid-extraction in counterflow at a temperature between 30 and 110° C. with a polar organic solvent or solvent mixture miscible with water and having a dielectric constant in the pure solvent or solvent mixture of less than 27 at 20° C., the water content of the system being between 4 and 28% by weight of the total weight of the extraction system, whereupon crystallisation of the xylose is brought about after removed of the solvent from the extract. The crystalline D-xylose obtained in this manner has a high degree of purity and the yield is good.

For enrichment of xylose the xylose containing extract obtained from the extraction can after removal of the solvent, e.g. by water steam, be submitted to a preliminary fermentation with saccharromyces so as to remove hexoses, whereupon the D-xylose is crystallised. This treatment is suitable only when a starting product having a high content of hexoses is used, so that fermentation alcohol in utilizable amounts is precipitated.

In the methods previously used for extracting D-xylose from xylan containing materials the lignin is left undissolved at the hydrolysis, whereas a considerable part of the cellulose is dissolved as glucose. In order to manufacture pure D-xylose from this hydrolysate a difficult and expensive fractionation process must be carried out to separate D-xylose from glucose. According to the present invention a partial hydrolysis is carried out with a weak acid buffer solution, especially a bisulphite solution, so as to let the cellulose content of the xylan containing plant material remain unaffected, whereas the xylan with part of or the entire lignin is dissolved. After deadening and neutralizing the hydrolysate with basic or deadening salts, especially $CaCO_3$ and/or $Ca(OH)_2$, the hydrolysate is concentrated to the concentration suitable for the following extraction.

The extraction is carried out as a liquid-liquid-extraction, wherein a polar organic solvent or solvent mixture, especially having a dielectric constant lower than 27 at 20° C. in the pure solvent or solvent mixture, is fed in counter current towards the xylose containing concentrated hydrolysate. The extraction temperature and the water content of the system are determined by the selected solvent, meaning that with an organic solvent of high polarity a low water content and a low temperature should be used, whereas a solvent of low polarity requires a higher water content and higher temperatures.

By the method according to the invention at a first stage an extract is obtained that is e.g. preferably obtained in isopropanol and contains 50–70% xylose and 30–50% impurities, also comprising other kinds of sugar. In view of the large amounts of impurities it was not to be expected that the subsequent, simple crystallisation from a low-molecular alcohol, preferably methanol, carried out but once and without further purifying treatment, like for instance a treatment with an ion exchanger or with an absorbent, would yield a crystalline xylose showing a degree of purity permitting use for pharmaceutical objectives, and this result was most surprising to experts in the field of sugar crystallisation.

In the following table the relationship between the nature (polarity) of the used solvent and the water content of the extraction system is shown for seven polar solvents:

TABLE

| No. | Solvent used | ε₂₀° C. in pure solvent | Water content, percent by weight of total amount | |
|---|---|---|---|---|
| | | | Minimum | Maximum |
| 1 | Isopropanol | 20 | 6.9 | 21.8 |
| 2 | n-Propanol | 21 | 5.2 | 16.1 |
| 3 | Isobutanol | 18 | 6.0 | 12.2 |
| 4 | Ethyl acetate | 6 | | |
| 5 | Butandiol-(1,4) | 31 | 0.0 | 0.2 |
| 6 | n-Butanol | 18 | 7.2 | 20.4 |
| 7 | Acetone | 21 | 4.7 | 16.3 |

It is obvious that a most selective dissolution of D-xylose from concentrated xylanhydrolysate, especially bisulphite waste liquor from leaf wood is contingent upon the fact that the used organic solvent has a polarity lower than that of methanol. It is known, for example, from the Norwegian Pat. No. 91,670 that methanol can be used for the fractionation of lignosulfonates, when low molecular lignosulfonate is dissolved from sulfite waste liquor. However, the method described in said patent specification cannot be used for extracting D-xylose.

Ethanol having a dielectric constant of 25 at 20° C. is apparently near the border-line for carrying out the present method, although ethanol can be used for extraction as shown in the following Example 1, with a water content of approximately 5% and a temperature of 65° C. In this case the concentrate phase is so viscous that it must be considered a border-line case of liquid-liquid-extraction. If a further addition of water and increase of temperature is tried to reduce the viscosity of the concentrate phase, dark extracts are obtained which result in poor yields of low quality.

The condition for the applicability of a polar organic solvent for the extraction of D-xylose as according to the present invention thus can be expressed as follows: the dielectric constant of the pure solvent or solvent mixture should be lower than 27 at 20° C. Furthermore, a lower limit condition for the polarity of the pure solvent can be determined, no applicable solvents with dielectric constant lower than 10 having been found. This is illustrated in Example 6, where the ethyl acetate with dielectric constant 6 at 20° C. was tried. At this low polarity the solubility of xylose in the pure solvent is practically nil and the solubility of water in the solvent is negligible as well.

The water content of the extraction system plays an essential role as to the selectivity of D-xylose extraction, and most definite limits can be defined for each solvent. Generally it can be said that the water content must be within the range of 5 to 25% of the total weight of the system so as to permit a liquid-liquid-extraction on one hand and on the other hand to prevent too much impurities in the form of low molar ligno sulfonates, aldonacid salts, sulfocarbonic acid salts etc. to be dissolved.

The water content of the system and the extraction temperature in dependence of the dielectric constant in the pure, polar and organic solvent or solvent mixture used for the extraction of D-xylose according to the present invention is diagrammatically shown in the enclosed triangular graph, FIG. 1.

Figure 2:
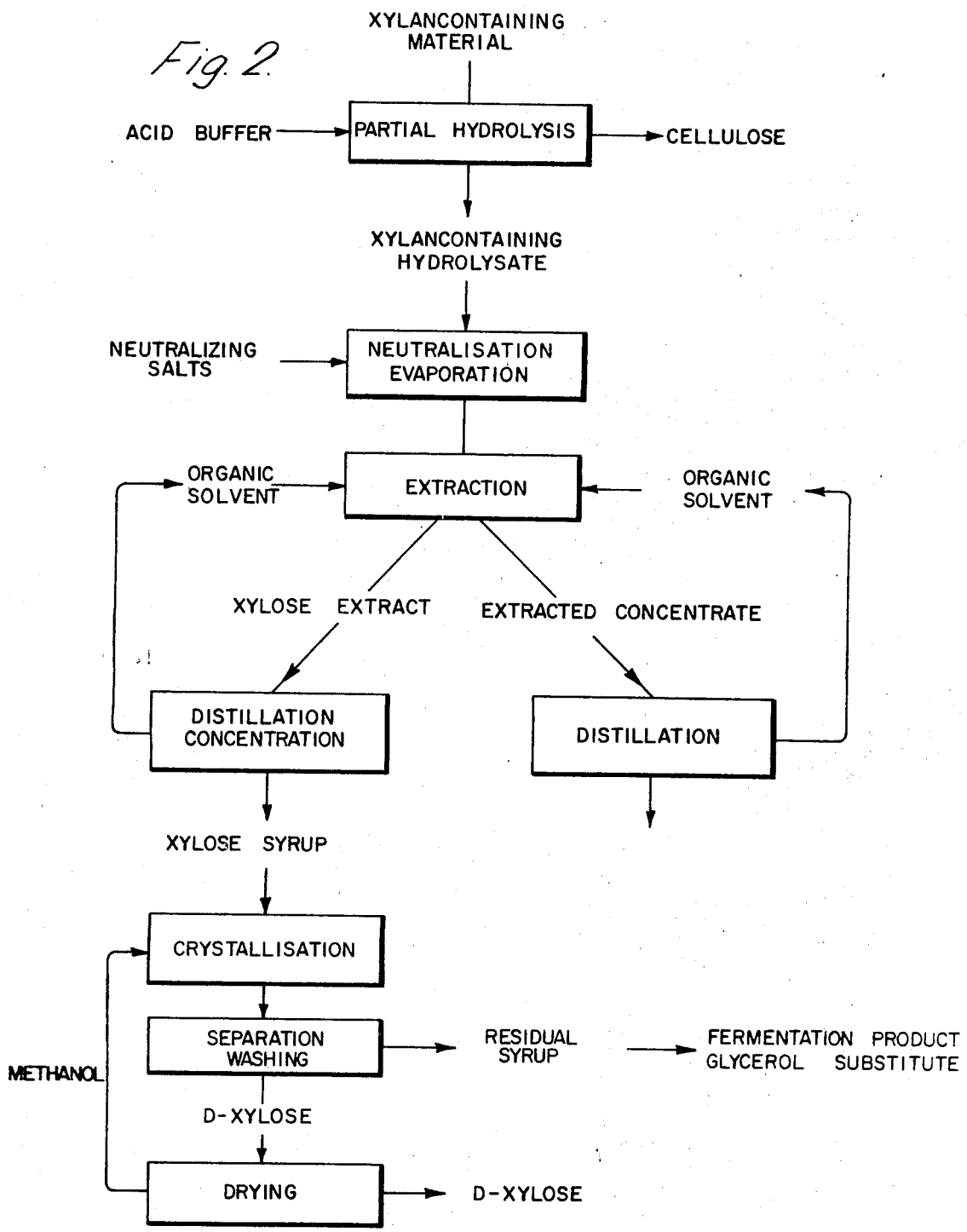

In the subsequent Examples 1 and 2 the method is illustrated, and it is referred to the enclosed flow-diagram, FIG. 2. The Examples 3–9 illustrate the dependence of the water content of the extraction system.

EXAMPLE 1

To 100 g. sulfite liquor powder of brich wood with a water content of 6.6% (93.4 g. dry substance) were added 3 g. Ca(OH)₂ and 300 ml. 96% ethanol. The components were stirred during heating to 70° C. in a container provided with a recurrent cooler. The powder clotted somewhat, but the system, now containing 16.2 g. water=4.76% by weight, was still to be regarded a solid substance/liquid extraction. Water was added dropwise until the powder sintered into a viscous concentrate phase with good phase difference against the ethanol phase. The total amount of water: 18.3 g.=5.14%.

After stirring for 15 min. at 65° C. and standing for 20 min. the mixture yielded a light yellowbrown extract amounting to 216 ml.

To the concentrate now extracted once again 200 ml. 96% ethanol were added. The components were heated during stirring and water was again added, since the concentrate appeared much more viscous than in the first extraction. 1.2 ml. water were added, which means a water content of approximately 5% in the system. After 5 min. of stirring at 65° C. and 20 min. of standing 198 ml. extract were decanted.

The concentrate was extracted twice more according to the same method as for the two first extractions, and the total extracts from the 4 extractions amounted to 829 ml. with a dry substance content of 33.8 g. after vacuum concentration on a water bath.

After dissolving the dry substance in 50 ml. of warm ethanol to a relatively viscid liquid xylose crystallised in the course of the night in a refrigerator.

Yield: 10.8 g. D-xylose=10.8% by weight of powder weight with a degree of purity of more than 95% determined by thin layer chromatography and ash analysis.

EXAMPLE 2

To 138 g. sulfite liquor concentrate having 72.5% dry substance content 3 g. Ca(OH)₂ were added and stirred rapidly into the concentrate which was heated to 50° C. Then 250 ml. 90% isopropanol were added during stirring and heating to 70° C. The water content of the system was now 57.6 g. of the total amount 337.5 g.=17.1% by weight. After stirring for 15 min. at 70° C. and standing for 20 min. the mixture yielded a light yellow extract amounting to 148 ml. To the extracted concentrate were again added 150 ml. 90% isopropanol and the components were stirred for 15 min. at 70° C. This was repeated twice more and the total extracts from 4 extractions amounted to 628 ml. having a dry substance content of 31.8 g. after vacuum concentration on a water bath. After dissolution of the dry substance in 50 ml. warm methanol, D-xylose crystallised in the course of the night in a refrigerator, whereupon it was filtered off, washed with methanol and dried. Yield: 14.2 g. D-xylose with a slight after-taste. After stirring in cold methanol (50 ml.), filtering, methanol washing and drying:

12.8 g. D-xylose=12.8% by weight on dry substance basis, with a degree of purity of more than 97%, determined by thin layer chromatography and ash analysis.

EXAMPLE 3a

To 100 ml. 100% isopropanol 28 g. sulfite liquor dry substance from birch wood were added during stirring and heating in the form of 30 g. powder with a water content of 6.6% and with 1 g. Ca(OH)₂ added. The temperature was adjusted to 70° C. and maintained constant while water was added dropwise from a buret. After addition of 6 ml., the powder clotted to viscous mass and the isopropanol phase was quite clear and slightly yellow coloured. Hereafter the amount of water which the system contains at this point is called minimum amount of water=8 ml.=6.9% by weight. Addition of water was continued without further heating until the sulfite liquor phase had low viscosity and the phase limit was somewhat diffused with a slightly nuclear isopropan phase. The added amount of water 28.2 ml., together with the original water content corresponds to the amount of water hereinafter called maximum water amount=30.2 ml.=21.8% by weight of the total weight of the system. After 10 min. of stirring at 55° C. the system was left for sedimentation and cooling for 20 minutes. Decantation yielded a brown decantate, 57.2 g. which was still unclear. On a bath of boiling water in vacuum the decantate was concentrated by evaporation to a practically dry, bubbly sugar mass, weight 4.2 g. The sugar mass was dissolved in 10 ml. of methanol and left for cooling and crystallisation. After 24 hours the crystallised matter was filtered off, washed with 3× 10 ml. methanol and weighed after drying for 3 hours at 80° C. and 2 hours in an $CaCl_2$-exsiccator. The yield was 1.5 xylose of bad quality and colour.

EXAMPLE 3b

In the same manner as in Example 1, 100 ml. isopropanol and 28 g. sulphite-lye-dry-substance of birch wood had 6 ml. water added to receive the minimum amount of water, 6.9% by weight. The viscous sulphite lye mass was digested for 10 min. at 70° C. After standing for 20 min. the mass yielded 61.5 g. of a very light decantate. This was concentrated by evaporation as before to 2.8 g. of dry substance, which after the above mentioned crystallisation process yielded 1.1 g. xylose of very good quality and colour.

EXAMPLE 4a

In the before mentioned manner the minimum content of water for 28 g. sulphite-lye-dry-substance of birch wood in 100 ml. of n-propanol was determined at 87° C. to 6 ml.=5.2% by weight. The maximum amount of water 21.0 ml.=16.1% by weight yielded a decantate of a brownish yellow colour, 59.4 g. and 3.2 g. sugar substance after concentration by evaporation. After crystallisation a yield of 1.0 g. xylose, of a light, almost white colour, but having a bitter flavour, was obtained.

EXAMPLE 4b

The minimum amount of water was added to 100 ml. n-propanol and 28 g. sulphite-lye-dry-substance of birch wood at 87° C., as in Example 4a, but this time the powder would not agglomerate as desired. More water was added to achieve sintering, and totally 9.5 ml. water +2 ml.=11.5 ml.=9.55% by weight were added. After 10 minutes of stirring at 87° C., standing and decantation of 62.4 g. decantate, which was considerably darker than the decantate of the Example 3b, said decantate was concentrated by evaporation to 2.8 g. dry substance and this was crystallised in methanol. Yield: 1.2 g. xylose of good quality.

EXAMPLE 5a

For 100 ml. of isobutanol and 28 g. sulphite-lye-drysubstance as before, the minimum content of water was determined at 86° C. to 7 ml.=6.0% by weight. At maximum water content, 15.2 ml.=12.2% by weight, 63.3 g. of decantate were obtained, this decantate being somewhat darker than in Example 4b. After concentration by evaporation to 2.9 g. dry substance and crystallisation the yield was 0.8 g. xylose of bad quality.

EXAMPLE 5b 100 ml. isobutanol and 28 g. sulphite-lye-dry-substance of birch wood with minimum amount of water 6.0% by weight after stirring for 10 minutes at 86° C., standing and decantation of 64.2 g. decantate, resulted in a dry sugar substance amounting to 1.7 g. and a yield of 0.6 g. xylose of good quality.

EXAMPLE 6

100 ml. ethylacetate and 28 g. dry-sulphite-lye-substance of birch wood with various amounts of water—as expected—did not result in dissolution of D-xylose due to too poor miscibility with water and too low dielectric constant (6).

EXAMPLE 7

100 ml. butanediol-(1.4) and 28 g. dry-sulphite-lye-substance of birch wood resulted in a genuine solution, even with minimum amounts of water and low temperature, as expected for butanediol-(1.4)—which is hygroscopic and has a dielectric constant of 30 at 25° C.

EXAMPLE 8a

For 100 ml. n-butanol and 28 g. dry-sulphite-lye-substance as before, the minimum water content of the system was determined at 95° C. to 8.5 ml.=7.2% by weight. At the maximum water content 28 ml.=20.4% by weight 53.7 g. decantate of dark colour was obtained. After concentration by evaporation to 3.1 g. dry-substance and crystallisation, the yield was 0.5 g. D-xylose of light colour, but having a bitter flavour.

EXAMPLE 8b 100 ml. n-butanol and 28 g. dry-sulphite-lye-substance of birch wood with minimum amount of water, 7.2% by weight after 10 minutes of stirring at 95° C. and standing resulted in a decantate of 64.0 g. After concentration by evaporation to 2.8 g. and crystallisation, the yield was 0.5 g. D-xylose of good quality.

EXAMPLE 9a

For 100 ml. acetone and 28 g. dry-sulphite-lye-substance of birch wood as before, the minimum amount of water was determined at 50° C. to 5.3 ml.=4.68% by weight. At the maximum water content of 21 ml.=16.3% by weight, from 63.6 g. of decantate a dry sugar substance of 3.8 g. was obtained yielding 0.6 g. xylose of low quality.

EXAMPLE 9b 100 ml. of acetone and 28 g. of a dry-sulphite-lye-substance of birch wood with minimum amount of water, 4.68% by weight, after 10 minutes of stirring at 50° C. resulted in a very faintly coloured decantate of 62.3 g., which after concentration by evaporation to 0.8 g. of dry-substance and crystallisation yielded 0.1 g. xylose of good quality.

I claim:

1. A method for extracting D-xylose from xylan-containing plant material comprising: partially hydroyzing the plant material in weak acid to hydrolyze the xylan and at least part of the lignin present in the plant material without substantially decomposing cellulosic material present in the plant material; separating unhydrolyzed cellulosic material from the hydrolysate; neutralizing the hydrolysate; concentrating the hydrolysate; subjecting the concentrated hydrolysate to extraction with an extracting solution comprising water and at least one polar organic solvent, said polar organic solvent having a dielectric constant of less than 27 at 20° C., the water content of the extraction system being from 4 to 28% by weight, said solution being maintained at a temperature of from 30 to 110° C.; removing solvent from the extract to concentrate the extract; and crystallizing xylose present in the concentrated extract.

2. A method according to claim 1 wherein hydrolysis is effected with a bisulfite solution.

3. A method according to claim 1 wherein the concentrated extract is subjected to fermentation with saccharromyces to remove hexose prior to crystallization of said xylose.

4. A method according to claim 1 wherein said solvent comprises isopropanol.

5. A method according to claim 1 wherein said xylose is crystallized from methanol.

6. A method according to claim 2 wherein the hydrolysate is neutralized with a member selected from the group consisting of calcium hydroxide and calcium carbonate.

7. A method according to claim 1 wherein said solvent has a dielectric constant of not less than 10.

8. A method according to claim 1 wherein said extraction is carried out under conditions of temperature, water control, and dielectric constant within the shaded area of FIG. 1.

9. A method according to claim 3, characterized in that the preliminary fermented, aqueous xylose extract is supplied with a cation exchanger in H-form in order to remove the present cations and transfer salts to acids, whereupon the sour extract is supplied with chips of chrome tanned leather, which have previously been extracted with ammonium and washed with water in order to remove lignosulphonic acids or sulphocarbonic acids from the xylose extract by absorbing and binding these acids to the collagen, whereupon crystallisation of D-xylose is brought about.

References Cited

UNITED STATES PATENTS

| | | | |
|---|---|---|---|
| 2,073,616 | 3/1937 | Acree | 260—209 R |
| 2,218,567 | 10/1940 | White | 260—209 R |
| 2,868,778 | 1/1959 | Watson et al. | 260—209 R |

LEWIS GOTTS, Primary Examiner

J. R. BROWN, Assistant Examiner

U.S. Cl. X.R.

260—209 R